United States Patent [19]

Hashimoto

[11] Patent Number: 4,760,712
[45] Date of Patent: Aug. 2, 1988

[54] FREEZING APPARATUS

[75] Inventor: Masahide Hashimoto, Nagasaki, Japan

[73] Assignee: Mitsubishi Denki Kabushiki Kaisha, Tokyo, Japan

[21] Appl. No.: 47,391

[22] Filed: May 8, 1987

[30] Foreign Application Priority Data

May 30, 1986 [JP] Japan .................. 61-125537

[51] Int. Cl.⁴ ............................................. F25D 25/02
[52] U.S. Cl. ........................................ 62/381; 62/341; 198/836
[58] Field of Search .................. 62/341, 381; 198/836

[56] References Cited

U.S. PATENT DOCUMENTS

| | | | |
|---|---|---|---|
| 4,261,183 | 4/1981 | Plomp | 62/381 |
| 4,534,183 | 8/1985 | Hashimoto et al. | 62/374 |
| 4,555,914 | 12/1985 | Kauio et al. | 62/341 |
| 4,583,375 | 4/1986 | Sasaki | 62/341 |

FOREIGN PATENT DOCUMENTS 51-46818  12/1976  Japan .
55-5022   2/1980  Japan .
54-95047  1/1984  Japan .

Primary Examiner—Ronald C. Capossela
Attorney, Agent, or Firm—Armstrong, Nikaido, Marmelstein & Kubovcik

[57] ABSTRACT

A freezing apparatus capable of chilling articles to be chilled or frozen by chilling each article substantially from the entire surface thereof through contact freezing for quick chilling or freezing. The freezing apparatus comprises a rotary chilling plate disposed in a horizontal position for rotation about a vertical axis, an annular tube formed of a flexible sheet, placed over the rotary chilling plate so as to be in contact with the upper and lateral surfaces of each article placed on the rotary chilling plate, and adapted to be driven together with the rotary chilling plate about the same vertical axis, and a brine tank disposed under the rotary chilling plate so that chilly brine supplied therein flows along the lower surface of the rotary chilling plate as the same overflows the brine tank, and adapted to be rotated together with the rotary chilling plate. Chilly brine is circulated through the annular tube and the brine tank to chill each article substantially from the entire surface thereof for quick chilling or freezing without causing the article to dry and lose in weight.

5 Claims, 3 Drawing Sheets

FREEZING APPARATUS

BACKGROUND OF THE INVENTION

The present invention relates to a freezing apparatus and, more specifically to a freezing device for quickly chilling or freezing articles, such as foodstuffs, in a chilly ambience by exposing the entire surfaces of the articles to a chilly atmosphere.

In a conventional freezing apparatus for such a purpose as shown in FIG. 5, an endless steel belt 1 formed of a single stainless steel sheet having a smooth flat surface is extended between a driving pulley 3 and a tension pulley 2 disposed at the delivery station 11 and at the feed station 10 of the freezing apparatus, respectively. The driving pulley 3 is driven by a variable-speed motor at an optional speed to regulate the freezing duration, while the tension pulley 2 applies a fixed tension to the endless steel belt 1. A brine tank 4 is disposed under the upper run of the endless steel belt 1 in contact with the inner surface of the upper run. Articles 5 to be frozen are fed onto the endless steel belt 1. A blowing device comprising a finned chilling coil unit 6 is disposed above the endless steel belt 1. A duct 8 forms a path for circulating chilly air through a freezing zone 12 defined by a heat-insulating tunnel 9. Chilly brine 13 chilled by a brine chiller, not shown, is supplied into the brine tank 4 through a brine supply pipe 14, and is returned through a brine return pipe 15 to the brine chiller to circulate the chilly brine through the brine tank 4. A refrigerant is supplied from an external refrigerator through a refrigerant supply pipe 16 into the finned chilling coil unit 6, and is returned through a refrigerant return pipe 17 to the refrigerator to circulate the refrigerant through the finned chilling coil unit 6.

In operation, articles 5 successively supplied from the feed station 10 onto the endless steel belt 1 are conveyed at a fixed conveying speed through the freezing zone 12. While being conveyed through the freezing zone 12, the articles 5 are frozen by the chilly endless steel belt 1 chilled by the brine 13 contained in the brine tank 4 in a so-called contact freezing mode. On the other hand, the upper portion of the article 5 is frozen by the chilly air chilled by the finned chilling coil unit 6 and blown through the duct 8 by the blower 7 so as to circulate through the heat-insulating tunnel 9. The articles 5 thus frozen are discharged from the heat-insulating tunnel 9 and are delivered to the next process.

Although the lower portion of the article is frozen quickly in a so-called contact freezing mode, since chilly air is blown against the upper portion of the article, the upper portion of the article is frozen slowly at a low freezing speed, and thereby the upper portion of the article is caused to dry and lose in weight deteriorating the quality of the frozen article. Furthermore, since the conventional freezing apparatus comprises two chilling systems for chilling the brine and the air to be blown into the freezing zone, two refrigerators are necessary, which increases the initial cost and the running cost.

SUMMARY OF THE INVENTION

The present invention has been made to solve the foregoing problems of the conventional freezing apparatus.

Accordingly, it is an object of the present invention to provide a compact freezing apparatus capable of continuously freezing articles through the contact freezing of the upper surface and the lateral surface of the individual article as well as the lower surface of the same.

In one aspect of the present invention, articles to be frozen are mounted on a chilling plate and are covered with a flexible sheet so that the upper surface and lateral surface of each article are in contact with the flexible sheet, and the upper surface of the flexible sheet and the lower surface of the chilling plate are chilled simultaneously by a refrigerant such as chilly brine.

In another aspect of the present invention, articles to be frozen are mounted on a rotary chilling plate which rotates in a horizontal plane, the articles are covered with a flexible annular tube so that the upper surface and lateral surface of each article is in contact with the flexible annular tube, and the rotary chilling plate and the annular tube are turned in synchronism in a horizontal plane while the lower surface of the rotary chilling plate and the interior of the annular tube are chilled simultaneously by a refrigerant such as chilly brine.

In a freezing apparatus according to the present invention, the article to be frozen can be placed on a chilling plate with the lower surface thereof in contact with the chilling plate and the upper surface and lateral surface thereof in contact with a flexible sheet capable of extending along the external form of the article, and the lower surface of the chilling plate and the upper surface of the flexible sheet are chilled simultaneously. Accordingly, the upper surface and lateral surface of the article are chilled through contact freezing as well as the lower surface of the same, and hence the article is not caused neither to dry nor to lose in weight.

In another freezing apparatus according to the present invention, an annular tube formed of a flexible sheet is extended so as to conform to the external form of the article to be frozen and to be in contact with the upper surface and lateral surface of the same, and the lower surface of a rotary chilling plate mounted with the article and the interior of the annular tube are chilled simultaneously while the rotary chilling plate and the annular tube are turned in a horizontal plane for the continuous contact freezing of the article. This freezing apparatus capable of the continuous contact freezing of the article being turned in a horizontal plane is more compact in construction than a freezing apparatus in which articles to be frozen are conveyed linearly by a belt conveyor.

The above and other objects, features and advantages of the present invention will become more apparent from the following description when taken in conjunction with the accompanying drawings.

DESCRIPTION OF THE PREFERRED EMBODIMENTS

A freezing apparatus, in a preferred embodiment, according to the present invention will be described hereinafter with reference to FIGS. 1 to 4.

Figure 1:
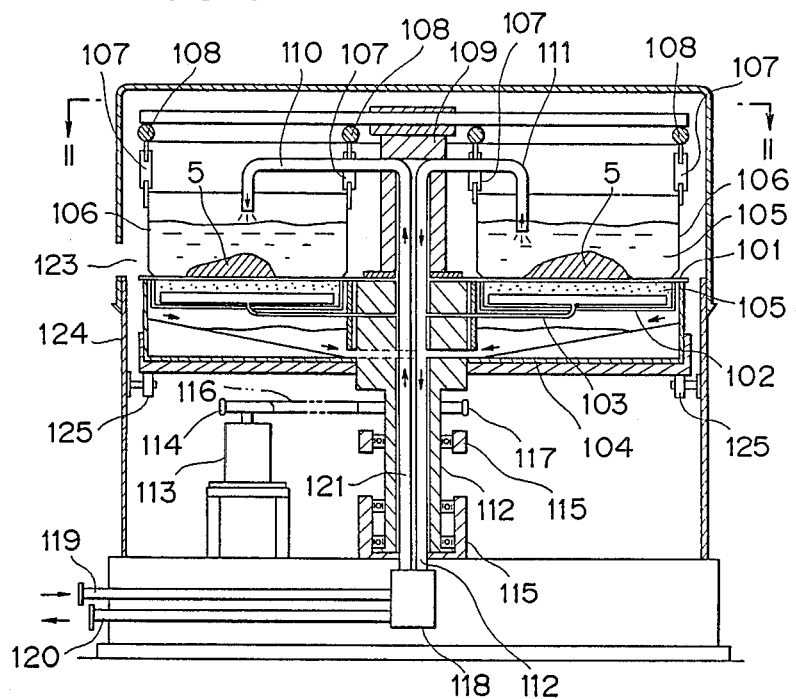
FIG. 1 is a sectional side elevation of a freezing apparatus, in a preferred embodiment, according to the present invention.
Figure 2:
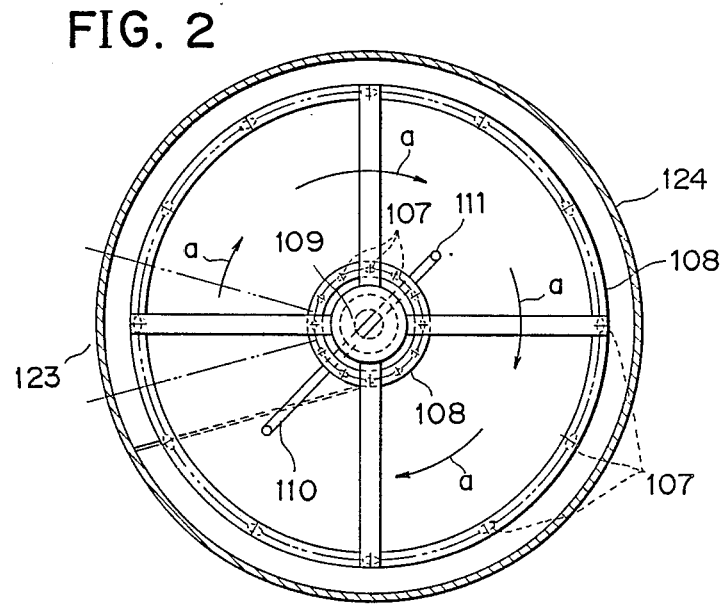
FIG. 2 is a sectional view taken on line II—II in FIG. 1.

Referring to FIGS. 1 and 2, there are shown a circular chilling plate 101 disposed in a horizontal position, a brine tank 102 disposed under the chilling plate 101 in a horizontal position, a brine pan 104 disposed below the brine tank 102 so as to receive the brine tank 102 therein, a plurality of brine supply pipes 103 for supplying chilly brine 105, i.e., a chilling medium, into the brine tank 102, an annular tube 106 formed of a flexible sheet placed on the upper surface of the chilling plate 101 in a horizontal position and filled with the brine 105, a ring frame 108 of a multiple ring construction disposed above the annular tube 106 in a horizontal position, a plurality of tube holders 107 attached to the inner circumference and outer circumference of the annular tube 106 at equal angular intervals, for example, twelve tube holders attached to the inner circumference and twelve tube holders attached to the outer circumference of the annular tube 106, for suspending the annular tube 106 from the ring frame 108, an upper shaft 109 supporting the ring frame 108, a brine supply pipe 110 for supplying the brine 105 into the annular tube 106, a brine discharge pipe 111 for discharging the brine 105 from the interior of the annular tube 106, a lower shaft 112 coaxially supporting the chilling plate 101, the brine tank 102, the brine pan 104 and the upper shaft 109, an electric motor 113 for rotatively driving the lower shaft 112, a driving gear 114 attached to the output shaft of the electric motor 113, a driven gear 117 attached to the lower shaft 112, a timing belt 116 wrapped around the driving gear 114 and the driven gear 117, bearings 115 rotatably supporting the lower shaft 112, a brine supply pipe 121 and a brine discharge pipe 122 extended through the interior of the lower shaft 112, a brine supply pipe 119 and a brine discharge pipe 120 connected to an external heat exchanger, not shown, and a rotary joint 118 joining the brine supply pipe 121 and the brine discharge pipe 122 to the respective lower ends of the brine supply pipe 119 and the brine discharge pipe 120, respectively. The respective upper ends of the brine supply pipe 121 and the brine discharge pipe 122 are connected to the brine supply pipe 110 and the brine discharge pipe 111, respectively. The brine supply pipes 103 are branched from the brine supply pipe 121. An opening is at a part of the brine discharge pipe 122 to allow the brine collected in the brine pan 105 to flow into the brine discharge pipe 122. An article passage 123 for feeding and taking out articles 5 therethrough is formed in a housing 124. The brine pan 104 is supported on a plurality of rollers 125 along the lower circumference thereof.

Figure 3:
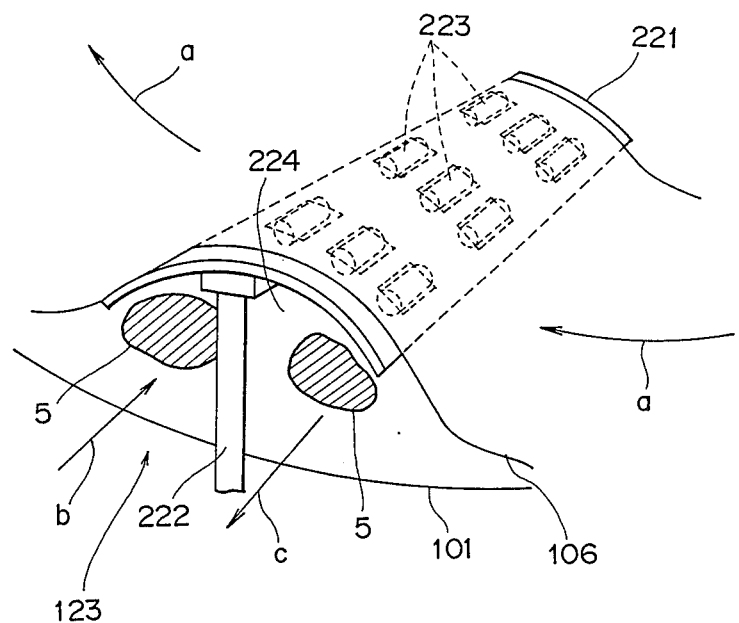
FIG. 3 is an enlarged perspective view showing the details of an article passage for feeding articles to be frozen and for taking out frozen articles therethrough.
Figure 5:
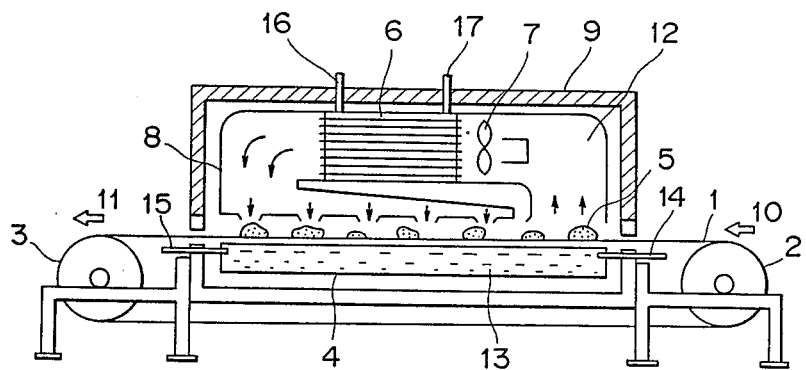
FIG. 5 is a sectional side elevation of a conventional freezing apparatus.

Referring to FIG. 3 showing the article passage 123 in detail, the annular tube 106 is lifted up by an arcuate lifting board 221 provided with a plurality of rollers 223 arranged in rows so as to protrude partially from the upper surface of the lifting board 221. The lifting board 221 is lifted up by a lift 222.

The manner of continuous freezing operation of the freezing apparatus will be described hereinafter.

The chilly brine 105 supplied from the heat exchanger flows through the brine supply pipe 119, the rotary joint 118 and the brine supply pipe 121, and then through the brine supply pipes 103 into the brine tank 102, and through the brine supply pipe 110 into the annular tube 106. On the other hand, the chilly brine 105 overflows the brine tank 102 and flows through the gap between the brim of the brine tank 102 and the chilling plate 101 into the brine pan 104. The brine 105 thus recovered flows into the brine discharge pipe 122. The chilly brine 105 supplied into the annular tube 106 is sucked up through the brine discharge pipes 111 and 122, the rotary joint 118 and the brine discharge pipe 120 by a pump, not shown, and is returned to the heat exchanger. Thus, the chilly brine 105 chilled by the heat exchanger is circulated through the brine tank 102 and through the annular tube 106 to keep the respective interiors of the brine tank 102 and the annular tube 106 at a low temperature, so that the lower surface of the chilling plate 101 and the interior of the annular tube 106 are chilled.

While the chilling plate 101 and the interior of the annular tube 106 are being chilled, the chilling plate 101 and the annular tube 106 are turned in synchronism in the same direction about a vertical axis. The lower shaft 112 is driven for rotation through the driving gear 114, the timing belt 116 and the driven gear 117 by the electric motor 113, so that the chilling plate 101, the brine tank 102 and the brine pan 104 are rotated together by the lower shaft 112, for example, in a direction indicated by arrows a in FIG. 2 about a vertical axis. The upper shaft 109 and the ring frame 108 rotate together with the lower shaft 112, so that the annular tube 106 suspended from the ring frame 108 by the tube holders 107 is rotated in synchronism with the chilling plate 101 also in the direction of the arrows a indicated in FIG. 2. The brine supply pipe 121 and the brine discharge pipe 122 are rotated together with the lower shaft 112. Since the brine supply pipe 121 and the brine discharge pipe 122 are joined to the brine supply pipe 119 and the brine discharge pipe 120, respectively, by the rotary joint 118, the brine supply pipe 121 and the brine discharge pipe 122 are able to be rotated together with the lower shaft 112.

Figure 4:
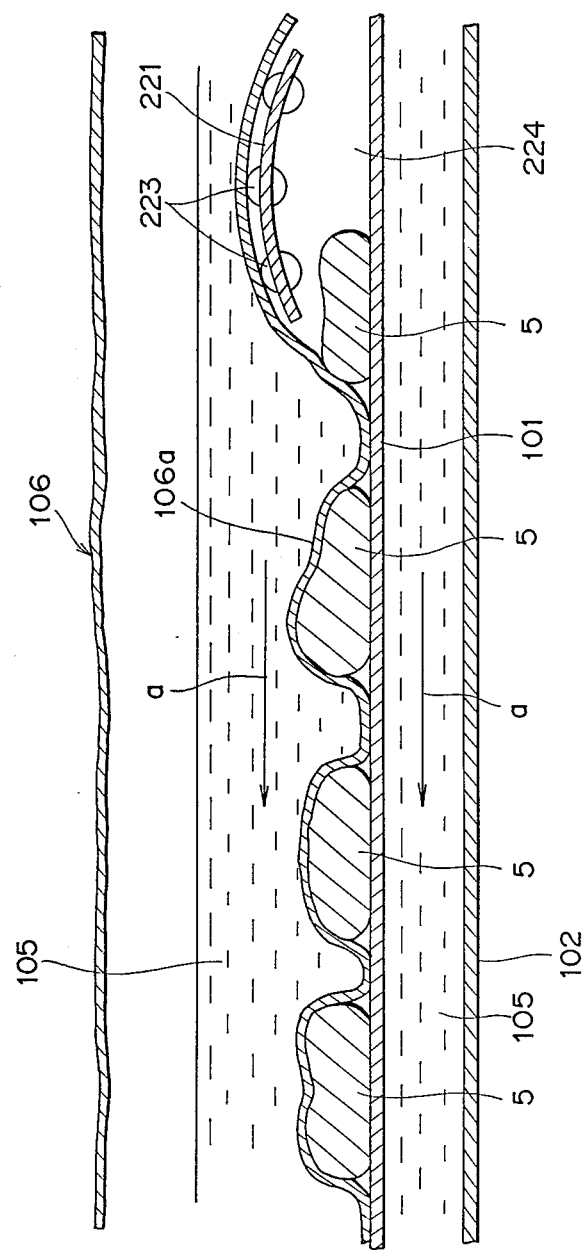
FIG. 4 is a sectional side elevation of assistance in explaining the manner of contact freezing of articles.

The articles 5 are fed onto the chilling plate 101 and the frozen articles 5 are taken off from the chilling plate 101 while the chilling plate is being chilled and rotated. Referring to FIG. 3, the lifting board 221 disposed under the annular tube 106 is lifted up by the lift 222 to form a space 224 between the upper surface of the chilling plate 101 and the annular tube 106. The article 5 is fed into the space 224 in a direction indicated by an arrow b, while the frozen article 5 is taken out from the space 224 in a direction indicated by an arrow c. While the articles 5 are being fed and taken out, the chilling plate 101 and the annular tube 106 are rotated continuously. Since the lifting board 221 is provided with the rollers 223, the annular tube 106 is able to rotate smoothly over the lifting board 221 in the direction of the arrow a. The articles 5 fed onto the chilling plate 101 are held successively between the chilling plate 101 and the annular tube 106 as shown in FIG. 4. Accordingly, the flexible bottom portion 106a of the annular tube 106 extends conforming to the external form of the article 5, so that the upper and lateral surfaces of the article 5 is in contact with the annular tube 106. Consequently, the entire surface of the article 5 is exposed to the chilling action of the chilling plate 101 and the annular tube 106 for quick chilling or quick freezing.

Thus, the freezing apparatus according to the present invention is capable of chilling the articles 5 substantially from the entire surface of each article 5 by contact freezing for quick chilling or quick freezing while the articles 5 are fed successively and conveyed continuously by the chilling plate 101 in the direction of the arrows a as indicated in FIG. 2.

In modifications, the circular chilling plate 101 and the annular tube 106 may be substituted by a polygonal (hexagonal or octagonal) chilling plate and a polygonal (hexagonal or octagonal) annular tube, respectively. In this embodiment, the brine supply pipe 121 and the brine discharge pipe 122 are extended separately in parallel to each other through the lower shaft 112, however, the brine supply pipe 121 and the brine discharge pipe 122 may be substituted by a single double-tube comprising two coaxial pipes. Although the embodiment described herein is provided with a single brine supply pipe 110 for supplying the brine into the annular tube 106 and a single brine discharge pipe 111 for discharging the brine from the annular tube 106, the freezing apparatus may be provided with a plurality of such brine supply pipes and a plurality of such brine discharge pipes.

The driving mechanism for driving the lower shaft 121 is not limited to that employing the timing belt 116, but may be of a chain drive system, a belt drive system or a gear drive system.

The bearings 115 rotatably supporting the lower shaft 121 may be either rolling bearings or plain bearings.

Furthermore, any refrigerant other than the chilly brine is available.

As apparent from the foregoing description, according to the present invention, an article to be frozen is chilled substantially from the entire surface thereof through contact freezing by the chilling plate which is in contact with the lower surface of the article and by the flexible sheet which is in contact with the upper and lateral surfaces of the same. Accordingly, the article can be frozen quickly and very efficiently in a short time without drying, losing in weight and deteriorating in quality.

Furthermore, the articles are fed successively onto the chilling plate and are held successively between the chilling plate and the annular tube formed of a flexible sheet so that each article is chilled or frozen substantially from the entire surface thereof through contact freezing while the chilling plate and the annular tube are rotated synchronously and continuously about a vertical axis. Still further, the freezing apparatus according to the present invention is more compact in construction and requires less floor space for installation than the conventional freezing apparatus employing a belt conveyor.

Although the invention has been described in its preferred embodiment with a certain degree of particularity, it is to be understood that many changes and variations are possible in the invention without departing from the scope and spirit thereof.

What is claimed is:

1. A chilling apparatus for chilling articles substantially from the entire surface of each article for quick contact chilling or contact freezing while the articles are being conveyed along a circular passage, which comprises:
    a housing having an article passage formed in a side thereof;
    a rotary chilling plate in said housing which receives the articles successively on the upper surface thereof, is driven for rotation in a horizontal plane, and is chilled over the lower surface thereof by a refrigerant;
    an annular tube formed of a flexible sheet, placed over the rotary chilling plate so as to cover the articles in contact with the upper and lateral surfaces of each article, and chilled by a refrigerant circulated through the interior thereof;
    means for synchronously rotating the chilling plate and the annular tube about a vertical axis; and means adjacent said article passage for continuously lifting said annular tube from said chilling plate to permit articles to be fed to and taken out from the space therebetween.

2. A chilling apparatus as recited in claim 1, wherein a brine tank is disposed under said chilling plate so as to be rotated together with the chilling plate, and chilly brine is circulated through the brine tank and said annular tube for chilling said chilling plate and said annular tube.

3. A chilling apparatus as recited in claim 1, wherein said chilling plate and said annular tube are circular in plan view.

4. A chilling apparatus as recited in claim 1, wherein said chilling plate and said annular tube are polygonal in plan view.

5. A chilling apparatus as recited in claim 1, wherein said means for continuously lifting said annular tube from said chilling plate comprises an arcuate lifting board radially disposed adjacent said article passage and interposed between said chilling plate and said annular tube, said lifting board lifting said annular tube up off of said chilling plate so that articles can be fed into and taken out from the space therebetween, said lifting board having an upper surface and being provded with a plurality of rollers arranged in rows so as to protrude partially from said upper surface of the lifting board.

* * * * *